La F. PARKER.
Rotary Steam-Engines.

No. 137,795.  Patented April 15, 1873.

Witnesses:
O. E. Duffy
T. C. Frecht

Inventor.
La Fayette Parker

UNITED STATES PATENT OFFICE.

LA FAYETTE PARKER, OF DAVENPORT, IOWA.

IMPROVEMENT IN ROTARY STEAM-ENGINES.

Specification forming part of Letters Patent No. 137,795, dated April 15, 1873; application filed January 20, 1872.

*To all whom it may concern:*

Be it known that I, LA FAYETTE PARKER, of the city of Davenport, in the county of Scott and State of Iowa, have invented certain Improvements in Rotary Steam-Engine and Rotary Pump, of which the following is a specification, reference being had to the accompanying drawing.

Nature and Objects of the Invention.

The first part of my invention relates to the direct application of the power of steam (with less loss and waste than any machine now in use) to producing a rotary motion of a shaft, passing through a stationary cylinder containing one or more chambers, by forcing forward, by its expansion, one or more steam-heads connected with shaft by arms. To this shaft may be attached any kind of machinery or the wheels of a steamboat or locomotive. The second part of my invention relates to the method of reversing said rotary motion at will. The third part of my invention relates to the use of the same machine, by changing the valves and attaching ordinary water receiving and discharging pipes, as a rotary pump.

Description of Accompanying Drawing.

Figure 2:
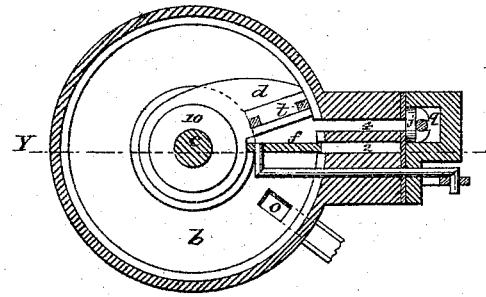
Figure 3:
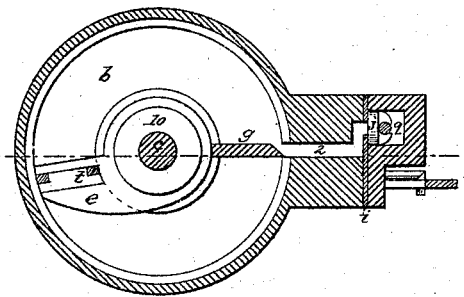
Figure 1:
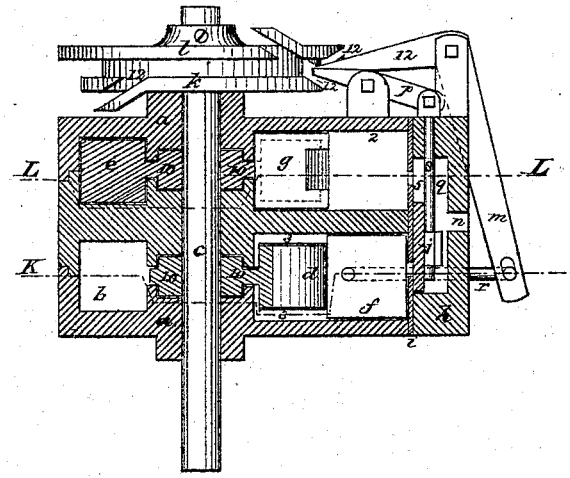
Figure 4:
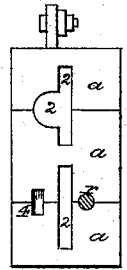
Figure 5:
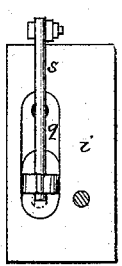
Figure 8:
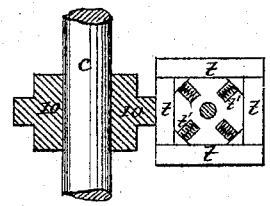
Figure 7:
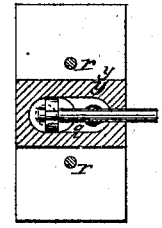
Figure 6:
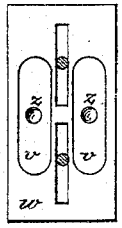

Figure 1 represents a horizontal section at dotted line $y$ in Figs. 2 and 3, except as to cams $l$ $d$ $k$, which are round. Fig. 2 is perpendicular section at dotted line K on Fig. 1. Fig. 3 is perpendicular section at dotted line L on Fig. 1. Fig. 4 shows the end of neck on the side of cylinder, under plate $i$, with its openings 2 and 4 for passage of steam, for rod $r$, and cut-offs $f$ and $g$. Fig. 5 represents plate $i$ covering the end of neck to cylinder with valve and openings. Fig. 6 is bottom of detached section, with double steam-chests for reversing motion, as placed against the end of neck when used. Fig. 7 shows section of extra steam-box with valves and openings as placed above double steam-boxes for the transfer of steam from one to the other. Fig. 8 represents packing of steam-heads.

General Description.

$a$ $a$ $a$, as a whole, represent a cylinder having within it the two chambers $b$ $b$, extending around its entire circuit near its outer rim. On one side of this cylinder is a neck, in which are passages for steam, 4, openings 2 2 for cut-offs $f$ and $g$ and for rod $r$. This cylinder is made stationary to some frame of strength proportioned to power of engine. $d$ and $e$ are steam-heads that revolve in chambers $b$ $b$ when forced forward by pressure of steam. They have holes, through which shaft $c$ passes, and are keyed to shaft $c$ on the opposite sides, holding the relative position, as shown in Figs. 1, 2, and 3. $f$ and $g$ are steam cut-offs. Cut-off $f$ is raised by action of cam $l$ on rod $r$ by lever $m$, while steam-head $d$ passes by it; then lowered by the same means. Cut-off $g$ is removed by inclined plane on back of steam-head $e$, and is returned to place by action of steam as it is let onto its outer end, and following it till it has reached the position it occupies in Fig. 3, when the steam passes out into steam-chamber back of steam-head through opening made by bevel on top of cut-off, as shown at 2, Fig. 3. $i$ is a plate on the outer end of neck to protect openings 2 2 and 4 from the steam, and forms the bottom of steam-box $h$, and having two openings, covered alternately by valve $j$ as moved by cam $k$, actuating, by lever P, rod $s$, and by it valve $j$. $h$ is the steam-box, in which is located valve $j$, and in its top is the aperture $n$, into which steam is passed by pipes from boiler. 3 3 3 3 are grooves, in which the cut-offs $f$ and $g$ rest when closed. 2 2 are openings to receive cut-offs while steam-heads press them. Steam is received at $n$ and escapes at $o$. (See Figs. 1 and 2.)

Operation.

The manner of operating my machine is simply to let on steam, through a pipe, from the steam-generator at the opening $n$, when immediately it passes out of steam-chest $q$ through either opening 5 or 6 that may be unclosed at the time. Say opening 6, as shown on Fig. 2, is unclosed, the steam rushes in between the cut-off $f$ and steam-head $d$, and, expanding, causes them to separate. The cylinder being stationary, steam-head moves forward until steam is shut off, which is at one-half a revolution, or till it reaches the vertical position occupied by steam-head $e$ in Fig. 3. The opposite steam-head, attached to same shaft $c$, has now passed the cut-off $g$ by pushing it laterally by its rounded back, and is in the same relative position as steam-head *d* holds in Fig. 2. The valve *j*, at the same time that it closes opening 6, opens 5, when steam presses against the end of cut-off *g* and carries it along the grooves 3 3 to its position in Fig. 3, when passage 2 is open to steam-chamber between cut-off *g* and steam-head, with same result as before. After steam-passage is closed to each chamber, the part of chamber between cut-off and steam-head being full of compressed steam, its expansive force still goes on, and forces steam-heads forward until its power is exhausted, or steam-head reaches escape-pipe at *o*, as located on Fig. 2, at the same time that direct application of steam is being made to opposite steam-head, thus using the entire expansive force of the steam.

The joints between the parts of the cylinder and around holes and steam-heads are so constructed as easily to be made steam-tight, and the heads are further packed by movable bars *t* resting in grooves on each of the four sides of the steam-head. These bars are pressed out against the sides of steam-chamber by springs placed back of them, as shown in Fig. 8.

To construct my rotary pump the ordinary receiving water-pipe and valve is attached at steam-receiving aperture, removing steam-valve and the ordinary discharge-pipe, a valve of size according to size of pump attached at escape *o* to conduct the water wherever desired, and then set it in motion by attaching my rotary steam-engine to the same shaft, or by gearing, as deemed best, according to desired location of pump, thus setting the shaft to revolve in the same direction, as shown, for engine and both chambers will continuously receive water and force it out through the same pipe, except while heads *d* and *e* are passing the discharge-pipe and cut-offs. The cut-offs for pump should both be removed from the so-called steam-chamber, as shown in case of cut-off *f*; or the neck should be at top of cylinder; then the weight of cut-off and water, if let in above it, would cause it to drop. If cam and lever is used the back of cut-off may be flat like its face.

For locomotive or steamboats, or where reverse of motion is desired, the cams can easily be so constructed as to perform their offices at the proper time by making but slight change at the transfer-passages 12 12 12 12. Lever *r* must be used to remove both cut-offs, and steam-heads or pistons be made the same on both faces. The escape must be capable of being opened and closed at will of operator. The steam may be let through a single steam-box, *q'*, with valve *x*, as seen in Fig. 7, to open and close passage to two other steam-chests, *v v*, as seen in Fig. 6, connecting with opposite sides of steam-heads; or there may be openings from the single steam-chest, as seen in Fig. 5, to opposite sides of the steam-heads, with valves or stops that can be opened and closed at will of operator.

*Modifications.*

This machine may be modified by having the cut-offs on both sides raised by rods, lever, and cam, the same as cut-off *f* is shown to be in drawing; or both cut-offs may be removed from passage in chamber by action of steam-heads, and returned by steam being let onto their outer end, and forcing them to place before it finds opening to chamber, as cut-off *g* is shown to operate in drawing.

It will readily be seen that the machine can be operated by letting the steam into a single chamber, if but little power is required, and the other chamber entirely closed, particularly if a balance-wheel is used; or it may be done by changing the cam *l*, so that steam can be let onto the single side used all the time, except while steam-head is passing the escape and cut-off.

It may also be modified by constructing the chambers round for the passage of a circular steam head or piston fitted tightly or packed with rings in the ordinary manner of piston-heads.

Steam-heads could be put on the same side of shaft, and valves constructed to apply steam in the same manner, as described, or through the hole on shaft.

The cut-offs could be moved into openings on the ends of cylinders, or they might be suspended in the outer circle of steam-chamber on rods, and swing into cavities of size to receive them by action of either cams upon the rods on which they are suspended, or by action of steam-heads, and returned either by their own weight or the action of steam let in above them.

*Claims.*

Having thus described my invention, what I claim as new is—

1. The arrangement of two parallel steam-chambers, *b b*, in a combined cylinder, *a a*, with cut-offs *f g* and pistons *e d*, attached on opposite sides radially to shaft *c* by hubs 10 10 in each steam-chamber, constructed and operated substantially as shown and described.

2. The arrangement of hub 10, shaft *c*, cylinder *a a*, and pistons *e d*, constructed substantially as shown.

3. The arrangement of cam *l*, rock-lever 12 and *m*, rod *r* to operate cut-off *f*, substantially as shown.

4. The arrangement of cut-off *g* in steam-passage 2 with piston *e*, to operate substantially as shown.

5. The arrangement of packing-bars *t* and spring *t'* with pistons *e* and *d*, substantially as shown and described.

LA FAYETTE PARKER.

Witnesses:
W. L. CARROLL,
SAMUEL ROBERTS.